United States Patent [19]
Jonville et al.

[11] 3,926,674
[45] Dec. 16, 1975

[54] METHOD OF MANUFACTURING ELECTRICAL CONNECTION ELEMENTS FOR SUPPORTING ELECTRODES FOR STORAGE CELLS

[75] Inventors: Pierre Jonville; Helmut Stöhr, both of Plan-les-Ouates, Geneva; Klaus D. Beccu, Troinex, Geneva; René Baronnet, Grand-Lancy, Geneva, all of Switzerland

[73] Assignee: Battelle Memorial Institute, Switzerland

[22] Filed: Feb. 12, 1974

[21] Appl. No.: 441,853

[30] Foreign Application Priority Data
Feb. 12, 1973 Switzerland.......................... 1959/73
June 18, 1973 Switzerland.......................... 8848/73

[52] U.S. Cl.................................... 136/36; 136/66
[51] Int. Cl.²......................................... H01M 35/08
[58] Field of Search.................. 136/65–66, 136/35, 36, 58–59, 19, 27, 66; 29/2

[56] References Cited
UNITED STATES PATENTS

| | | | |
|---|---|---|---|
| 397,235 | 2/1889 | Hunter................................. | 136/35 |
| 2,610,220 | 9/1952 | Brennan............................... | 136/59 |
| 2,616,165 | 11/1952 | Brennan............................... | 136/19 |
| 3,275,473 | 9/1966 | Barnett et al......................... | 136/64 |
| 3,351,445 | 11/1967 | Fielder et al........................ | 136/27 X |
| 3,476,604 | 11/1969 | Faber................................... | 136/36 |

*Primary Examiner*—Anthony Skapars
*Attorney, Agent, or Firm*—Robert E. Burns; Emmanuel J. Lobato; Bruce L. Adams

[57] ABSTRACT

A method of producing battery electrodes by advancing a strip of felt of glass fibers longitudinally and intended to function as supports for electrodes. Connecting members for the electrodes are formed on the felt at longitudinally spaced zones by injecting molten lead or a lead alloy into these zones. The injection is accomplished by clamping the strip periodically between two mold halves defining a cavity corresponding to the desired configuration of a connecting member to be formed on the felt electrode support and injecting the molten lead or lead alloy into the cavity under pressure so that it is injected to or penetrates into the felt. The molten material is solidified in the cavity and a compacted, electrically conductive connecting member is accordingly formed in the corresponding zone. The electrode in electrical contact with these zones formed may be developed by metallizing the felt before or after formation of the connecting members. The felt is then cut to the lengths desired for the electrodes with connecting members formed thereon.

4 Claims, 3 Drawing Figures

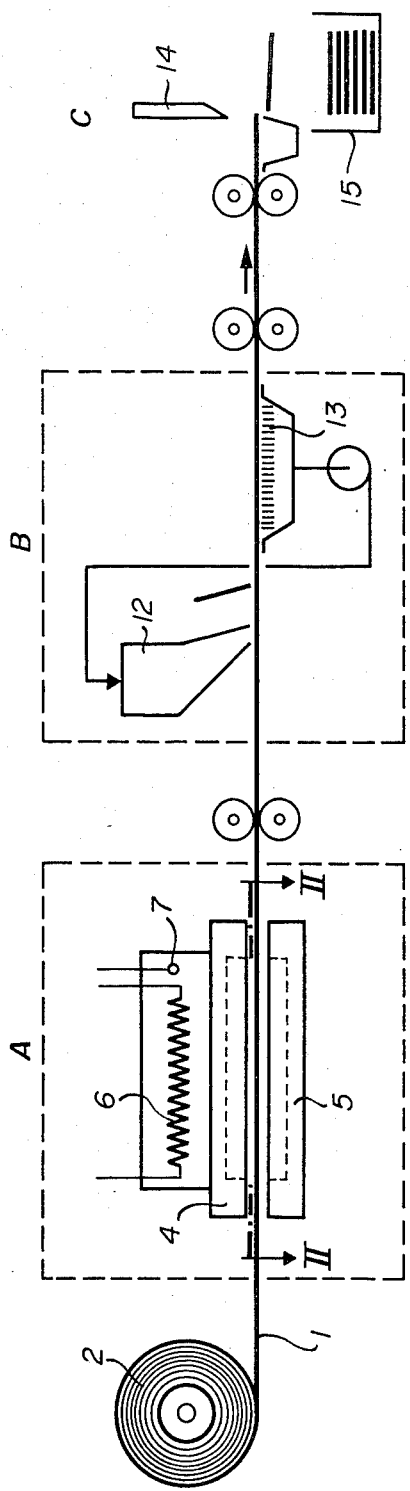
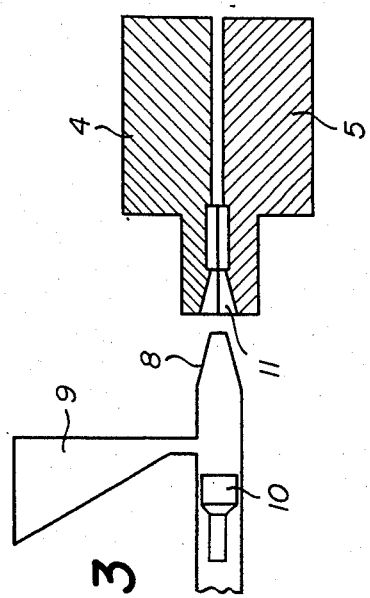
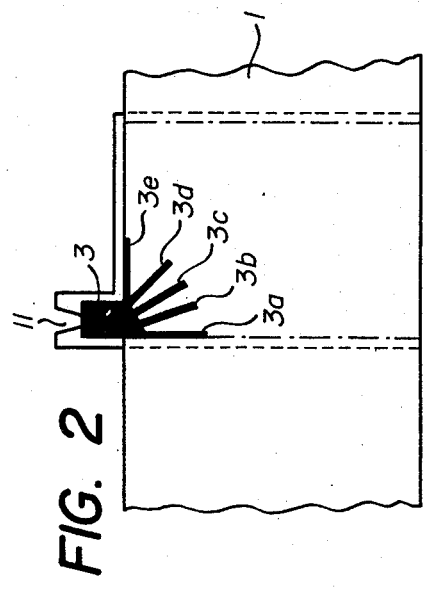
FIG. 1
FIG. 3
FIG. 2

METHOD OF MANUFACTURING ELECTRICAL CONNECTION ELEMENTS FOR SUPPORTING ELECTRODES FOR STORAGE CELLS

BACKGROUND OF THE INVENTION

This invention relates generally to batteries and more particularly to electrodes for lead storage batteries and the support and connectors therefore.

Lead storage batteries are of great interest, particularly due to their low investment cost per installed kwhr and their great reliability and ruggedness. The use of this well known type of storage battery is, however, limited at the present time to a relatively restricted range of applications, due in particular to various drawbacks inherent in the structure of the present electrodes, as well as the processes necessary for their manufacture.

Although the theoretical specific energy of the cell $Pb/H_2SO_4/PbO_2$ amounts to 170 whr/kg, the value obtained in practice up to now with lead storage batteries is only about 30 whr/kg. The large specific weight of the present storage batteries of this type is due in large part to the fact that they comprise electrode supports in the form of molded grids of lead, as well as to the fact that the coefficient of utilization of the active material is limited. These grids furthermore satisfy only to a limited extent the requirements with respect to resistance to corrosion on the one hand and to the maintaining of their electric contact with the active material during the cycling on the other hand.

Furthermore, the molding of these support grids scarcely lends itself to the continuous manufacture of the electrodes. In addition, the present methods of manufacture include a so-called pasting operation which consists in introducing a pasty mixture formed of lead, lead oxide, water and sulfuric acid into the support grids. This pasting operation as well as the subsequent chemical reactions, however, require precise control. Satisfactory pasting, as a matter of fact, is possible only if one avoids the prior setting of the mixture used for the pasting. Therefore, it is difficult to effect the manufacture continuously with good reproducibility.

Now, the present processes for the manufacture of electrodes for lead storage batteries are carried out batchwise since the casting of the grids on the one hand and the preparation of the reaction mixture, followed by the pasting, on the other hand are operations which are independent of each other. Another drawback of the present processes of manufacturing electrodes with cast support grids is that they do not permit the obtaining of very thin electrodes, of a thickness of less than about 1.5 mm. This constitutes a major obstacle with respect to the improvement in the utilization of the active material, as well as to an increase of the power per unit of weight of the present lead storage batteries.

Various processes for manufacturing electrodes with the aid of different non-conductive supports have also been proposed which make it possible to lighten the electrodes.

Thus, for instance, it has been proposed to use a perforated support of a non-conductive material on which the active material is fixed by pasting, as well as a fibrous layer containing a conductive material. In accordance with a variant, it has been proposed to manufacture electrodes for lead storage batteries by providing a support grid of synthetic resin with a conventional lead-acid paste and securing a fabric of glass fibers which are covered with lead onto the support grid prepared in this manner. It thus becomes possible to decrease the weight of the electrodes, but the incorporation of the active material by pasting, as well as the fastening thereof and its satisfactory bonding to the metallized glass fibers nevertheless require difficult operations which are not compatible with continuous manufacture on an industrial scale. As a matter of fact, in addition to the necessity of assuring an intimate contact between the assembly of the active material and the metallized fibers, the making of firmly anchored electrode contacts which make it possible to assure a satisfactory electrical connection raises problems which become particularly important in mass production. Finally, the use of such support grids does not make it possible either to substantially reduce the thickness of the electrodes as compared with the aforementioned conventional electrodes which are provided with cast lead grids.

As is known, the obtaining of connecting members which are firmly attached to electrodes of fibrous structure in order to assure the electrical contact upon mounting in a storage battery has generally up to now required several relatively complicated operations which do not fall in line with the requirements of rapid manufacture on an industrial scale.

Thus most of the methods of fastening which are currently used (welding, riveting, clamping, etc.) in order to assure the fastening of the connecting members to the electrodes raise substantial technical problems. Now, these problems are particularly difficult to solve in the case of the electrodes recently proposed for lead-acid storage batteries of the type comprising a light, porous support formed of a metallized or non-metallized non-conductive material serving to bear the active material of the electrode. As a matter of fact, the mechanical properties of lead scarcely lend themselves to said conventional methods of attachment, so that connecting members formed of lead and firmly anchored in the electrodes are particularly difficult to produce.

SUMMARY OF THE INVENTION

The object of the present invention is to overcome the above-mentioned drawbacks so as substantially to simplify the manufacture of thin, light electrodes intended for lead acid storage batteries.

For this purpose, the object of the invention is a process of manufacturing electrical connecting members which are integrated in a felt of glass fibers which is intended to form the support for the electrodes of lead storage batteries, which process is characterized by injecting lead or a lead alloy in molten state into a predetermined portion of the felt so as to obtain after solidification a compact conductive zone which is firmly anchored in the felt and is intended to form the desired electrode connecting member.

In accordance with a preferred variant of this process, the connecting members can be manufactured by introducing the said felt into a mold comprising two parts arranged on opposite sides of the felt so as to form a cavity defining the desired contour of the connection member and gripping the felt outside said cavity, while injecting molten lead or lead alloy under pressure into said cavity in such a manner that the material injected fills said cavity and penetrates into a predetermined zone of the felt located in said cavity, and that it solidifies rapidly in the cavity to form therein the connecting member integrated with the felt in the said zone.

BRIEF DESCRIPTION OF THE DRAWINGS

The invention is explained below by examples and by the accompanying drawing in which:

FIG. 1 is a diagrammatic view in schematic vertical section, an installation for the continuous manufacture of electrodes which comprises a device for the carrying out of the process of the invention.

FIG. 2 is a section view along the section line II—II of FIG. 1.

FIG. 3 is a schematic vertical section through the said device.

DESCRIPTION OF THE PREFERRED EMBODIMENTS

EXAMPLE 1

Positive or negative electrodes are produced continuously in the following manner:

A. Preparation of the support and of contact zones

A i. As starting material for the electrode supports there is used a felt of glass fibers assembled by means of a binder, in the form of a continuous strip having, in the present case, a width of 900 mm, a thickness of 1.2 mm, and a specific weight of 1.5 g/dm$^2$. The strip is heated by a stream of hot air in order to remove all moisture from it.

A ii. A continuous metalizing of the glass fibers constituting the strip is effected with a lead-antimony alloy - (3% Sb by weight) which is deposited by spraying. This deposit is intended to assure satisfactory electronic conduction within the electrode; however, this metalizing is not indispensable in a negative electrode.

A iii. In order to obtain the electrode contacts subsequently, the same lead alloy (with 3% Sb) is injected in multi-state into three longitudinal zones whose center lines are located 150, 450, and 750 mm. from one or the other edge of the strip respectively, so that these three zones, each with a width of 30 mm, is entirely filled by the alloy.

B. Introduction of the active material

The strip which has thus been metalized and provided with said compact longitudinal zones is then subjected to a continuous impregnation which serves to introduce into the pores of the metalized belt a pulverulent material (PbO/Pb mixture) intended to supply the active material of the electrodes. This impregnation is effected by forming a suspension of the said powdered material in deionized water and then subjecting this suspension to a continuous filtration by suction through the moving metalized strip so that the particles of said material are retained and fill up in part the space between the metalized fibers of the strip.

C. Obtaining of the electrodes

Once dried, the strip is cut transversely at distances apart of 110 mm whereupon the plates thus obtained are cut into six electrode plates which have dimensions of 135 × 110 mm and are provided with a contact lug of 30 × 15 mm.

These electrode plates are then stored in a conditioning tank so as to oxidize the metallic lead introduced into the felt and transform it into PbO.

The so-called forming operation is finally carried out, which makes it possible to obtain the active material of the positive and negative electrodes.

The electrodes thus obtained are now ready for use, possible after drying and storage before mounting in the lead storage batteries.

EXAMPLE 2

Negative electrodes each provided with a fastening member and intended for lead-acid storage batteries are produced continuously.

Fig. 1 shows — very schematically — various operations which are carried out during the manufacture. As starting material there is used a continuous strip 1 formed of glass fibers assembled by means of a binder and intended to constitute the support for the electrodes. This support strip is wound on a storage drum 2 from which it is unwound and used horizontally by means of a drive device (not shown) which makes it possible to impose upon it an intermittent movement corresponding to the rate of the operations described below:

A. Preparation of the support and of the connecting members

Successive sections of the support strip 1, each corresponding to one electrode, are first of all subjected to an injection operation A. This operation by itself makes it possible to form a connecting member 3 in situ, that is to say, on the support strip 1, and at the same time to assure a solid securing of said member 3 (see FIG. 2) on the support due to "fingers" 3a to 3e which penetrate into the support.

This operation A is carried out by means of an injection device having two movable shells 4 and 5 intended to enclose each section corresponding to an electrode. These shells 4 and 5 have engravings which together form a mold defining a cavity which corresponds to the contour of the connection member 3 (see FIG. 2). The remaining parts of these shells are however arranged in such a manner that the said section of the strip 1 is subjected to a pinching outside the contour of the cavity of the mold.

The temperature of the mold is furthermore maintained at a constant value, of about 50°C in the present case, by means of a thermostat, indicated schematically by the elements 6 and 7 in Fig. 1.

As can furthermore be noted from FIG. 3, the injection operation is carried out by means of a nozzle 8 which communicates with a reservoir 9 for molten lead maintained at a constant temperature of between 400° and 500°C. A piston 10 associated with the nozzle 8 makes it possible rapidly to inject a given quantity of molten lead under pressure after the introduction of the nozzle 8 into an injection passage 11 formed by the two shells 4 and 5 when they clamp the support strip 1.

The connecting members 3 are thus formed successively when the support strip 1 is advanced step by step, the injection being effected each time upon the positioning of the corresponding section of the stationary strip between the shells 4 and 5. For this purpose, the following steps are carried out each time:

closing of the shells 4, 5 of the mold;

application of the injection nozzle 8 against the passage 11 of the mold;

operation of the piston 10 so as to remove a given quantity of molten lead from the reservoir 9 and inject it rapidly, under pressure, into the cavity of the mold; the liquid lead thus penetrates into the corresponding zone of the support strip and solidifies as soon as it has filled the cavity;

opening of the shells 4, 5 of the mold after the retraction of the nozzle 8.

This sequence of steps makes it possible very rapidly to obtain the connecting element 3 firmly anchored to each section of the support strip 1 which is intended to supply an electrode. As a matter of fact, it is sufficient to advance the strip 1 over a distance corresponding to the width of a section in order to be able to form the following connecting member.

B. Introduction of the active material

Each section, provided with its connecting member 3, then passes into a zone B where a powdered mixture formed of PbO and Pb is introduced into the interstices of the strip 1 by filtration. For this purpose, a suspension of this mixture in the ionized water is taken from a tank 12 and distributed over the strip 1 while the latter moves and comes opposite a filter device 13 arranged below the strip 1. The suspension is then subjected to suction through the strip 1 and undergoes filtration during which the suspended particles are retained and gradually fill up the interstices of the strip.

C. Obtaining

The strip 1, which has thus been impregnated and is provided with a series of connecting members 3, is then cut into plates by means of a cutting device 14 so as to obtain the electrode plates of the desired width, each corresponding to one of the said sections of the strip. These plates are then transferred to a tank 15 where they are stored before being subjected to the final operation, referred to as forming, which serves for obtaining the sponge lead constituting the active material. For this purpose forming techniques well known in the manufacture of lead electrodes are used.

There are thus obtained negative electrodes provided with their active material and already having their electric connecting members 3 whose fingers 3a to 3e make it possible to assure good electrical contact with the active material.

EXAMPLE 3

Negative electrodes are produced by first of all carrying out operations A and B described above in Example 2. However, before the cutting of the electrodes the powdered mixture introduced into the strip 1 upon the filtration is subjected to a drying with ambient air followed by a treatment for several minutes with sulfuric acid in dilute aqueous solution. This treatment with acid serves partially to transfer the PbO contained in the mixture into $PbSO_4$. Furthermore, the electrode plates which have been treated in this manner and are cut and stored in the tank 15 are subjected for 24 hours to air of 50°C and 50% relative humidity. A treatment serving to transform the metallic lead contained in the electrode plates into PbO is thus carried out in said tank 15. In this way there are obtained negative electrode plates which can be stored for relatively long periods of time until they are mounted in a lead-acid storage battery where they can be subjected to a preliminary electro-chemical forming operation before being placed in use.

EXAMPLE 4

Positive electrodes each provided with an electric connecting member, intended for lead-acid storage batteries, are continuously manufactured.

For this purpose the installation shown in FIGS. 1 to 3 is employed to carry out the operations (A), (B) and (C) described in Example 2.

However, before forming the connecting members 3 by operation A, the support strip 1 comping from the storage drum 2 is subjected to a metalization which makes it possible to cover the glass fibers constituting the strip 1 with a thin covering of a lead-antimony alloy. This metalizing is effected by the spraying of the molten alloy by means of two electric arc spraying devices (not shown) between which the strip 1 is caused to move at constant speed.

The strip which has thus been metalized is thus provided with contact members and impregnated, this being done by carrying out respectively the operations A and B described in Example 1. The strip 1, which has thus been metalized and is provided with connecting members 3 and impregnated is then subjected to drying and to treatment with sulfuric acid before it is cut into plates which are stored in the tank 15 where they are treated, all of these treatments being carried out in the manner described in Example 3.

In this way there are obtained positive electrode plates which can be stored for long periods of time and which are ready for mounting in a lead-acid storage battery. After mounting, the electrodes can be subjected to an electrochemical forming operation before being placed in use.

As is evident from the above examples, the present invention permits the manufacture of very thin electrodes of small thickness which are provided with a strong, light, fibrous support having a firmly anchored contact and are formed to the major part of the respective active material. These advantages are lend however, due to the invention, by a process of manufacture which comprises only simple operations which are easy to control and thus permit continuous manufacture with the aid of well-known techniques and apparatus which are particularly well suited for automatic manufacture in very large numbers.

The invention also makes it possible in all cases to assure good conductivity of the electrode support, and to do so in a particularly simple manner. As a matter of fact, the spraying of molten lead, as described in Example 4, is based on conventional techniques which lend themselves well to continuous manufacture in large series. As can be noted, however, from Examples 2 and 3, the prior metalizing of the fibers is not indispensable in all cases. As a matter of fact it is possible to assure sufficient conductivity for the electrode even without forming a coating of lead by spraying, this constituting an additional simplification of the process of manufacture.

It should be noted that the same means can be used to carry out various operations upon the manufacture of the positive and negative electrodes and that certain operations described in the examples can be carried out simultaneously in both cases.

We claim:

1. A method of forming electrical connecting members having a desired configuration and forming an integral part of a felted fiber-glass electrode support structure comprising, providing a felt of glass fibers to function as an electrode support, and locally injecting molten lead or lead alloy under pressure into said fiber-glass structure within a given zone thereof in a desired configuration to simultaneously form and incorporate a desired connecting member in said support structure.

2. A method of forming electrical connecting members having a desired configuration and forming an integral part of a felted fiber-glass electrode support structure according to claim 2, in which said injecting lead or lead alloy comprises clamping said felt between two mold halves defining a mold cavity corresponding to the desired configuration of said zone, and injecting the molten lead or lead alloy into said cavity under pressure to penetrate into said felt along said zone to form therein the connecting member.

3. A method of manufacturing battery electrodes having integral electrical connecting members comprising, advancing an electrode support structure comprising a strip of felt of glass fibers advanced longitudinally, periodically at local zones spaced longitudinally on said felt of glass fibers injecting lead or a lead alloy in a molten state into portions of said felt corresponding to said zones and in a desired configuration to simultanelously form and incorporate compact, electrically conductive zones solidly anchored in said felt defining electric connecting members of the desired configuration for effecting electrical connections thereto, and severing said felt at given lengths for forming of electrodes each having at least one of said connecting members.

4. A method of manufacturing battery electrodes according to claim 3, in which said injecting of molten lead or lead alloy comprises clamping said felt between two mold halves defining a mold cavity corresponding to the configuration of said zones and the desired configuration of said connecting members, and injecting the molten lead or lead alloy into said cavity under pressure to penetrate into said felt along said zones to form therein the connecting members and simultaneously incorporate them in said electrode support structure.

* * * * *